(12) United States Patent
Ueda

(10) Patent No.: US 9,641,819 B2
(45) Date of Patent: May 2, 2017

(54) DISPLAY DEVICE INCLUDING A PLURALITY OF SUB-SIGNAL PROCESSING CIRCUITS CORRESPONDING TO A PLURALITY OF VIDEO SIGNAL COLORS, AND METHOD OF CONTROLLING DISPLAY DEVICE

(71) Applicant: Seiko Epson Corporation, Tokyo (JP)

(72) Inventor: Yuki Ueda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/541,730

(22) Filed: Nov. 14, 2014

(65) Prior Publication Data

US 2015/0138440 A1 May 21, 2015

(30) Foreign Application Priority Data

Nov. 19, 2013 (JP) ................................. 2013-238594

(51) Int. Cl.
*H04N 9/12* (2006.01)
*H04N 9/77* (2006.01)
*H04N 9/31* (2006.01)

(52) U.S. Cl.
CPC ............ *H04N 9/77* (2013.01); *H04N 9/3105* (2013.01); *H04N 9/3182* (2013.01)

(58) Field of Classification Search
CPC .... H04N 9/3197; H04N 9/315; H04N 9/3105; H04N 9/3126; H04N 9/3182; H04N 9/77; H04N 9/12; G03B 21/00
USPC ........................................................ 348/383
See application file for complete search history.

(56) References Cited

U.S. PATENT DOCUMENTS

| | | | | |
|---|---|---|---|---|
| 5,629,743 A | * | 5/1997 | Lee | H04N 9/67 348/659 |
| 6,191,826 B1 | * | 2/2001 | Murakami | H04N 9/3105 348/744 |
| 7,234,822 B2 | * | 6/2007 | Uchiyama | H04N 9/3197 348/E9.027 |
| 7,256,841 B2 | * | 8/2007 | Hibi | H04N 9/315 348/679 |
| 7,319,439 B2 | * | 1/2008 | Uchiyama | H04N 9/3105 345/32 |
| 7,453,475 B2 | * | 11/2008 | Nitta | G09G 3/002 345/589 |
| 2002/0012104 A1 | * | 1/2002 | Ogawa | G03B 21/00 353/31 |

(Continued)

FOREIGN PATENT DOCUMENTS

JP    2006-72231 A    3/2006
JP    2009-229646 A    10/2009

*Primary Examiner* — Michael Lee
(74) *Attorney, Agent, or Firm* — ALG Intellectual Property, LLC

(57) ABSTRACT

A display device includes a main signal processing circuit to which color video data is input, and a plurality of sub-signal processing circuits to which video data for respective colors output by the main signal processing circuit are input. The main signal processing circuit generates information, which is used when each of the sub-signal processing circuits performs a predetermined process, based on information of a plurality of colors in the color video data input, and then outputs data representing the generated information to each of the sub-signal processing circuits together with the video data for the respective colors.

4 Claims, 5 Drawing Sheets

(56) References Cited

U.S. PATENT DOCUMENTS

| | | | |
|---|---|---|---|
| 2003/0103162 A1* | 6/2003 | Sano | H04N 9/3147 348/383 |
| 2004/0227905 A1* | 11/2004 | Kimura | G03B 21/2053 353/85 |
| 2006/0066547 A1* | 3/2006 | Nitta | G09G 3/006 345/88 |
| 2006/0202930 A1* | 9/2006 | Uchiyama | H04N 9/3105 345/89 |
| 2006/0203202 A1* | 9/2006 | Uchiyama | H04N 9/3126 353/31 |
| 2007/0211218 A1* | 9/2007 | Nitta | H04N 9/312 353/30 |
| 2008/0024652 A1* | 1/2008 | Aoki | H04N 9/3105 348/361 |
| 2008/0174742 A1* | 7/2008 | Ito | G03B 21/14 353/31 |

\* cited by examiner

DISPLAY DEVICE INCLUDING A PLURALITY OF SUB-SIGNAL PROCESSING CIRCUITS CORRESPONDING TO A PLURALITY OF VIDEO SIGNAL COLORS, AND METHOD OF CONTROLLING DISPLAY DEVICE

The entire disclosure of Japanese Patent Application No. 2013-238594, filed Nov. 19, 2013, is expressly incorporated by reference herein.

BACKGROUND

1. Technical Field

The present invention relates to a display device for processing color video data, and a method of controlling the display device.

2. Related Art

In the past, there has been known a display device (a projection display device) provided with liquid crystal panels for modulating light beams of red (R), green (G), and blue (B), and for combining and then projecting the light beams thus modulated by these liquid crystal panels (see, e.g., JP-A-2006-72231). The display device of this kind performs a variety of processes on a color video signal (color video data) input therein to generate image data of the respective colors, and then drives the liquid crystal panels based on the image data thus generated.

Here, in the display device described above, it is assumed to dispose signal processing circuits each having a function of executing a process based on a video signal for the respective colors. By adopting such a configuration, it is expected that the processing load of each of the signal processing circuits is reduced to increase the processing efficiency, and that the necessity of increase in performance of each of the signal processing circuits is suppressed. In this case, if it is possible to reduce the amount of data input to the signal processing circuits of the respective colors, it becomes possible to achieve improvement in communication efficiency in a bus related to the input of each of the signal processing circuits, improvement in processing efficiency in each of the signal processing circuits, and so on.

SUMMARY

An advantage of some aspects of the invention is to reduce the amount of data input to signal processing circuits of respective colors in the condition of disposing the signal processing circuits for the respective colors.

An aspect of the invention is directed to a display device including a main signal processing circuit to which color video data is input, and a plurality of sub-signal processing circuits to which video data for respective colors output by the main signal processing circuit are input, and the main signal processing circuit generates information, which is used when each of the sub-signal processing circuits performs a predetermined process, based on information of a plurality of colors in the color video data input, and then outputs data representing the generated information to each of the sub-signal processing circuits together with the video data for the respective colors.

According to this configuration, the sub-signal processing circuits disposed for the respective colors use not only the information of the corresponding colors, but also the information based on the information of the plurality of colors in performing the predetermined process, and the main signal processing circuit generates the information based on the plurality of colors, and then outputs the information to each of the sub-signal processing circuits. Therefore, it is not necessary to output the video signal of the plurality of colors from the main signal processing circuit to the sub-signal processing circuits, and thus, the reduction in the amount of data to be input to each of the sub-signal processing circuits can be achieved.

Another aspect of the invention is directed to the display device according to the aspect of the invention described above, wherein each of the sub-signal processing circuits performs a process based on information related to luminance, and the main signal processing circuit generates the information related to the luminance based on the information of the plurality of colors in the color video data input, and then outputs data representing the generated information related to the luminance to each of the sub-signal processing circuits together with the video data for the respective colors.

Here, the information related to the luminance is calculated based on the information of the plurality of colors such as a weighted average of RGB values. Further, according to the above configuration, since the main signal processing circuit generates the information related to the luminance, and then outputs the information to each of the sub-signal processing circuits, it is not necessary to adopt a configuration in which the video signals of the plurality of colors are input to each of the sub-signal processing circuits, and each of the sub-signal processing circuits generates the information related to the luminance, and thus, the reduction in the amount of data to be input to each of the sub-signal processing circuits can be realized.

Still another aspect of the invention is directed to the display device according to the aspect of the invention described above, wherein the display device further includes a color modulation section and a luminance modulation section corresponding to each of the colors, each of the sub-signal processing circuits generates a drive signal for driving the color modulation section corresponding to a color based on the video data input and corresponding to the color, and then outputs the drive signal to the corresponding color modulation section, and each of the sub-signal processing circuits generates a drive signal for driving the corresponding luminance modulation section based on the data representing the information related to the luminance input, and then outputs the drive signal to the corresponding luminance modulation section.

According to this configuration, it becomes possible to appropriately drive the color modulation section and the luminance modulation section while achieving the reduction in amount of data input to each of the sub-signal processing circuits.

Yet another aspect of the invention is directed to the display device according to the aspect of the invention described above, wherein the main signal processing circuit outputs the video data for the respective colors to each of the sub-signal processing circuits in sync with a vertical sync signal, and the main signal processing circuit outputs the data representing the information, which is used when each of the sub-signal processing circuits performs the predetermined process, to each of the sub-signal processing circuits in a blank period formed after completion of output of the video data in a period corresponding to one cycle defined by the vertical sync signal.

According to this configuration, the reduction in amount of data input to each of the sub-signal processing circuits can more efficiently be realized.

Still yet another aspect of the invention is directed to a method of controlling a display device including: a main signal processing circuit to which color video data is input, and a plurality of sub-signal processing circuits to which video data for respective colors output by the main signal processing circuit are input, the method including allowing the main signal processing circuit to generate information used when each of the sub-signal processing circuits performs a predetermined process based on information of a plurality of colors in the color video data input, and output data representing the generated information to each of the sub-signal processing circuits together with the video data for the respective colors.

According to this configuration, the sub-signal processing circuits disposed for the respective colors use not only the information of the corresponding colors, but also the information based on the information of the plurality of colors in performing the predetermined process, and the main signal processing circuit generates the information based on the plurality of colors, and then outputs the information to each of the sub-signal processing circuits. Therefore, it is not necessary to output the video signal of the plurality of colors from the main signal processing circuit to the sub-signal processing circuits, and thus, the reduction in amount of data to be input to each of the sub-signal processing circuits can be achieved.

According to the aspects of the invention, the amount of data input to the signal processing circuit of each of the colors can be reduced in the condition of disposing the signal processing circuits for the respective colors.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, an embodiment of the invention will be described with reference to the accompanying drawings.

Figure 1:
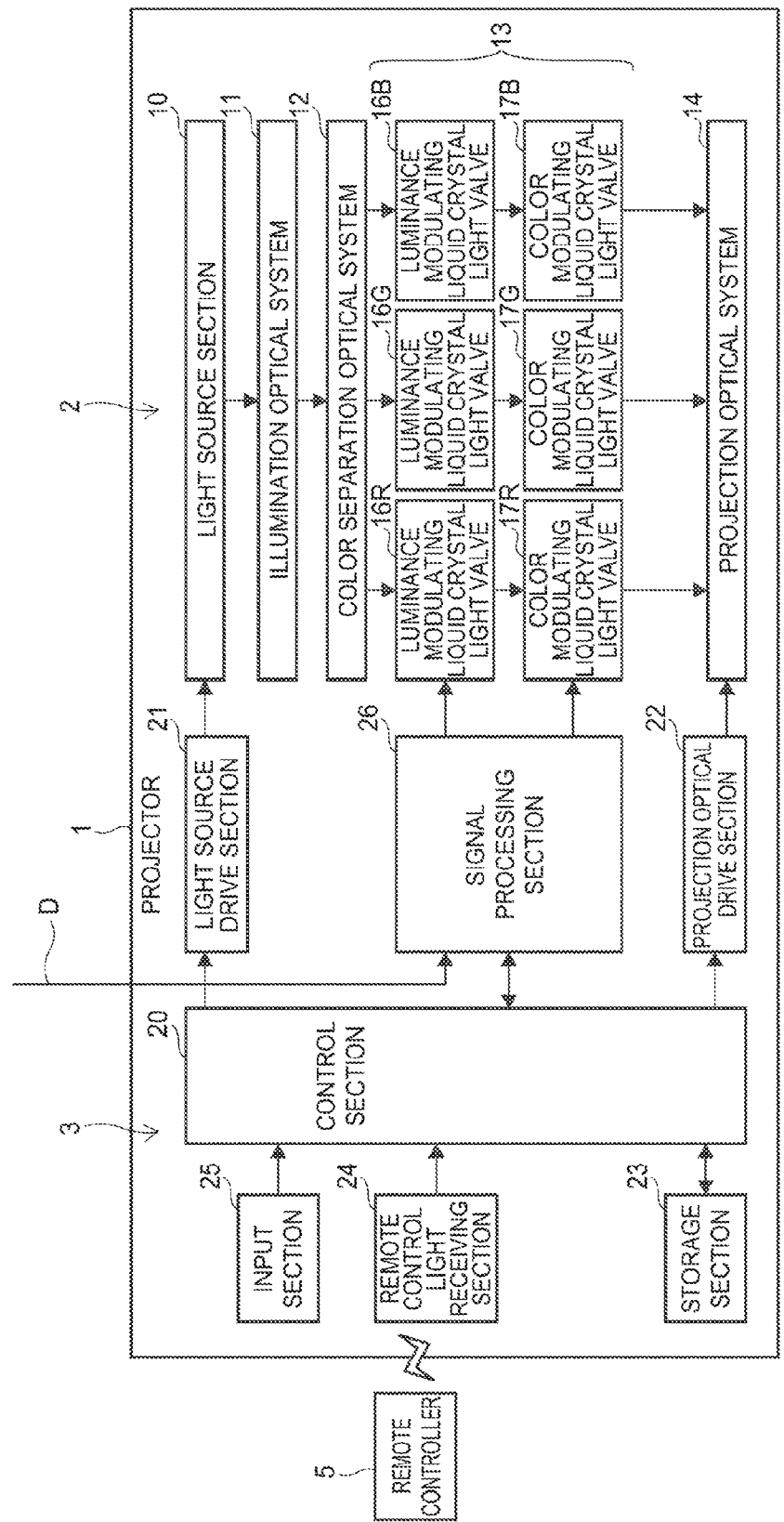
FIG. 1 is a diagram showing a configuration of a projector according to an embodiment of the invention.

FIG. 1 is a block diagram showing an overall configuration of a projector 1 (a display device) as a display device according to the present embodiment. The projector 1 is a device to be connected to an external image supply device (not shown) such as a personal computer or a variety of types of video players, and for projecting an image based on a color video signal D (color video data) input from the image supply device to a display surface such as a screen SC to thereby display the image on the display surface. As such an image supply device described above, there can be cited video output devices such as a video reproduction device, a DVD reproduction device, a television tuner device, a set-top box for CATV, or a video game device, a personal computer, and so on. The projector 1 can display both of a still image and a moving image.

The projector 1 is formed of a display system 2 for performing optical image formation, and an image processing system 3 for electrically processing the image to be displayed by the display system 2 in a general classification.

The display system 2 is provided with a light source section 10, an illumination optical system 11, a color separation optical system 12, a light modulation section 13, and a projection optical system 14.

The light source section 10 is provided with a light source having a xenon lamp, a super-high pressure mercury lamp, an LED, or the like, and outputs light emitted by the light source to the illumination optical system 11. The light source section 10 can also be provided with a reflector and an auxiliary reflector for guiding the light emitted by the light source to the illumination optical system 11, and can also be a system provided with a lens group (not shown) for improving the optical characteristics of the projection light, a polarization plate, a dimming element for reducing the light intensity of the light emitted by the light source on the path leading to the illumination optical system 11, and so on.

The illumination optical system 11 collimates the light emitted by the light source section 10, homogenizes the illuminance of the light, aligns the polarization direction of the light to one direction, and then outputs the result to the color separation optical system 12.

The color separation optical system 12 is provided with a reflecting mirror and a dichroic mirror, and separates the light input from the illumination optical system 11 into three colors of red (R), green (G), and blue (B) light, and then outputs the result to luminance modulating liquid crystal light valves 16R, 16G, and 16B (described later) in the light modulation section 13.

The light modulation section 13 is provided with the three luminance modulating liquid crystal light valves 16R, 16G, and 16B (each corresponding to a "luminance modulation section"), and three color modulating liquid crystal light valves 17R, 17G, and 17B (each corresponding to a "color modulation section") corresponding respectively to red (R), green (G), and blue (B).

The luminance modulating liquid crystal light valves 16R, 16G, and 16B are each a liquid crystal light valve having a plurality of pixels, the transmittance of which can independently be controlled, arranged in a matrix. The luminance modulating liquid crystal light valves 16R, 16G, and 16B each modulate the luminance of the incident light in the entire wavelength band of the light, and output the result to the color modulating liquid crystal light valves 17R, 17G, and 17B (described later), respectively. The luminance modulating liquid crystal light valves 16R, 16G, and 16B are each a member disposed for realizing a high luminance dynamic range. As described later in detail, the luminance modulating liquid crystal light valves 16R, 16G, and 16B are driven based on luminance information K (data representing information related to the luminance) described later to appropriately modulate the luminance of the light transmitted through the liquid crystal light valves. It should be noted that it is possible to adopt a configuration of disposing a fly-eye lens in each of posterior stages of the respective luminance modulating liquid crystal light valves 16R, 16G, and 16B, and achieving homogenization of the illuminance distribution.

The color modulating liquid crystal light valves 17R, 17G, and 17B are each a liquid crystal light valve having a plurality of pixels, the transmittance of which can independently be controlled, arranged in a matrix. The color modulating liquid crystal light valves 17R, 17G, and 17B change the transmittance of the light in each of the pixels arranged in a matrix to modulate the light input thereto, and then output the result. Each of the pixels of the color modulating liquid crystal light valves 17R, 17G, and 17B is controlled based on the image to be projected on the screen SC, and thus, the transmittance of the pixel is changed. As a result, the light transmitted through each of the liquid crystal light valves is modulated in accordance with the image to be projected. The light beams respectively modulated by the color modulating liquid crystal light valves 17R, 17G, and 17B are combined by a cross dichroic prism not shown, and then output to the projection optical system 14.

The projection optical system 14 is provided with a zoom lens for performing expansion and contraction of the image to be projected and adjustment of the focus, a zoom controlling motor for controlling the degree of the zoom, a focus adjusting motor for performing the focus adjustment, and so on. The projection optical system 14 projects the light modulated by the light modulation section 13 on the screen SC using the zoom lens and then images light.

Meanwhile, the image processing system 3 is provided with a control section 20, a light source drive section 21, a projection optical system drive section 22, a storage section 23, a remote control light receiving section 24, an input section 25, and a signal processing section 26.

The control section 20 is provided with a CPU, a ROM, a RAM, and other peripheral circuits, and controls each section of the projector 1.

The light source drive section 21 is provided with a drive circuit related to drive of the light source section 10, and so on, and drives the light source section 10 under the control of the control section 20.

The projection optical system drive section 22 is provided with a drive circuit related to drive of the projection optical system 14, and so on, and drives the projection optical system 14 under the control of the control section 20.

The storage section 23 is provided with a nonvolatile memory such as an EEPROM, and stores various types of data in a rewritable manner. The storage section 23 stores a control program related to the control of the projector 1.

The remote control light receiving section 24 decodes an infrared signal received from the remote controller 5, and then outputs the result to the control section 20. The control section 20 detects the operation content to the remote controller 5 based on the input from the remote control light receiving section 24.

The input section 25 is connected to an operating section such as a variety of switches or a touch panel provided to the projector 1, and detects the operation to the operating section to output the operation to the control section 20. The control section 20 detects the operation content to the operating section based on the input from the input section 25.

The signal processing section 26 drives the luminance modulating liquid crystal light valves 16R, 16G, and 16B and the color modulating liquid crystal light valves 17R, 17G, and 17B under the control of the control section 20.

Hereinafter, a configuration, a function, and a process of the signal processing section 26 will be described in detail.

Figure 2:
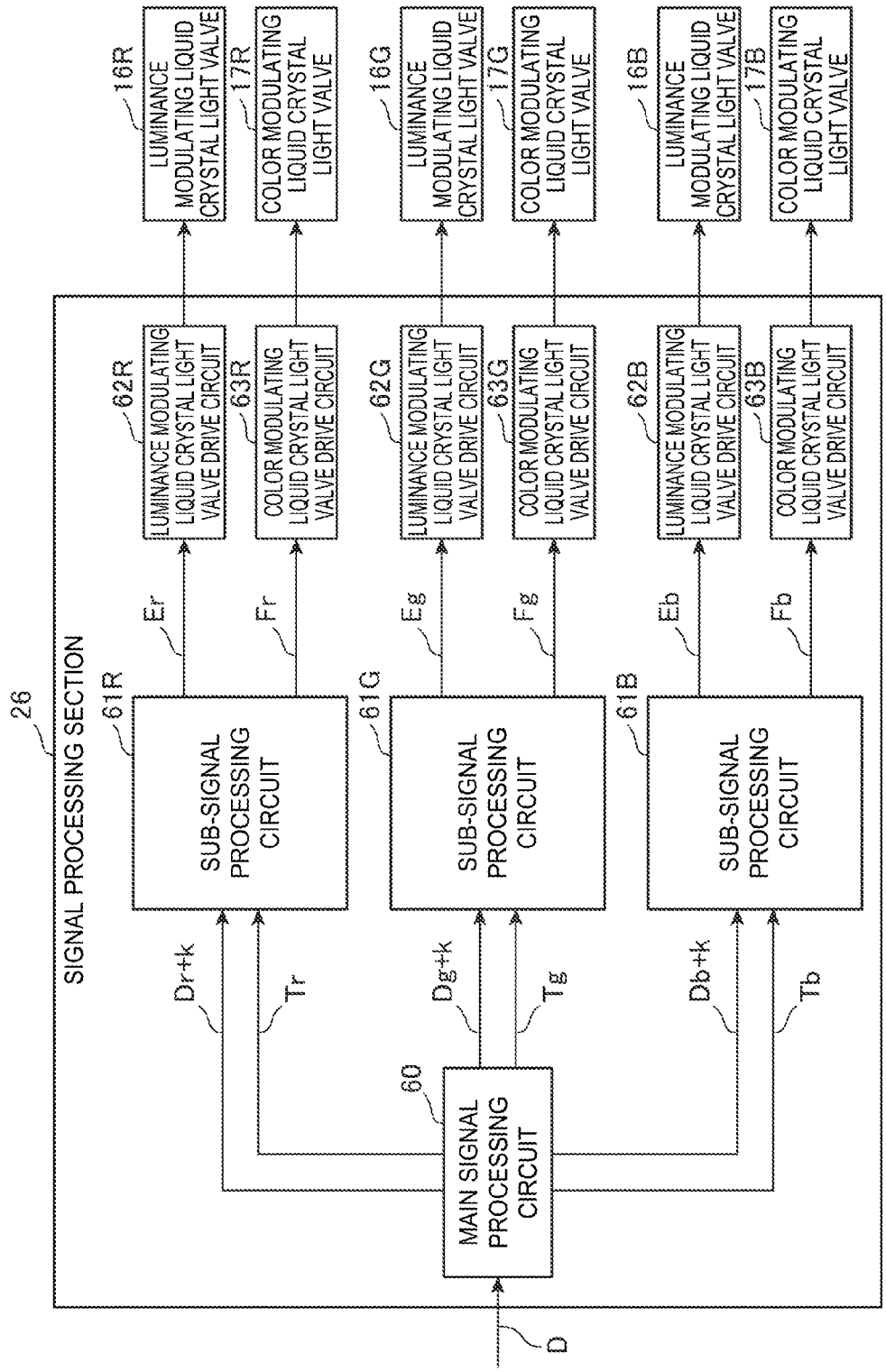
FIG. 2 is a block diagram showing a functional configuration of a signal processing circuit.

FIG. 2 is a diagram showing the configuration of the signal processing section 26.

As shown in FIG. 2, the signal processing section 26 is provided with a main signal processing circuit 60, three sub-signal processing circuits 61R, 61G, and 61B, and three luminance modulating liquid crystal light valve drive circuits 62R, 62G, and 62B and three color modulating liquid crystal light valve drive circuits 63R, 63G, and 63B respectively disposed for the sub-signal processing circuits 61R, 61G, and 61B. The main signal processing circuit 60 and the sub-signal processing circuits 61R, 61G, and 61B are each an integrated circuit (IC).

The basic function of each section of the signal processing section 26 will hereinafter be explained using FIG. 2.

The color video signal D is input to the main signal processing circuit 60 together with a vertical sync signal and a horizontal sync signal.

The main signal processing circuit 60 generates the luminance information K (described later) based on the color video signal D thus input.

Further, the main signal processing circuit 60 generates a red video signal Dr (video data for each color) as a video signal of a red component based on the color video signal D, and at the same time generates a timing signal Tr as a timing signal including the vertical sync signal and the horizontal sync signal, and then outputs the red video signal Dr, the luminance information K, and the timing signal Tr to the sub-signal processing circuit 61R.

Similarly, the main signal processing circuit 60 generates a green video signal Dg (the video data for each color) and a timing signal Tg related to green, and then outputs the green video signal Dg, the luminance information K, and the timing signal Tg to the sub-signal processing circuit 61G. Further, the main signal processing circuit 60 generates a blue video signal Db (the video data for each color) and a timing signal Tb related to blue, and then outputs the blue video signal Db, the luminance information K, and the timing signal Tb to the sub-signal processing circuit 61B.

The sub-signal processing circuit 61R outputs a drive signal Er to the luminance modulating liquid crystal light valve drive circuit 62R at an appropriate timing based on the luminance information K and the timing signal Tr thus input. The luminance modulating liquid crystal light valve drive circuit 62R is configured including a D/A conversion circuit and a driver IC, and applies a drive voltage to the luminance modulating liquid crystal light valve 16R based on the drive signal Er thus input, to drive the liquid crystal light valve, and thus varies the transmittance of the light in each of the pixels arranged in a matrix.

Further, the sub-signal processing circuit 61R outputs a drive signal Fr to the color modulating liquid crystal light valve drive circuit 63R at an appropriate timing based on the red video signal Dr and the timing signal Tr thus input. The color modulating liquid crystal light valve drive circuit 63R is configured including a D/A conversion circuit and a driver IC, and applies a drive voltage to the color modulating liquid crystal light valve 17R based on the drive signal Fr thus input, to drive the liquid crystal light valve, and thus varies the transmittance of the light in each of the pixels arranged in a matrix in accordance with the image to be projected.

Similarly, the sub-signal processing circuit 61G outputs a drive signal Eg to the luminance modulating liquid crystal light valve drive circuit 62G at an appropriate timing based on the luminance information K (described later) and the timing signal Tg thus input. The luminance modulating liquid crystal light valve drive circuit 62G is configured including a D/A conversion circuit and a driver IC, and applies a drive voltage to the luminance modulating liquid crystal light valve 16G based on the drive signal Eg thus input, to drive the liquid crystal light valve, and thus varies the transmittance of the light in each of the pixels arranged in a matrix. Further, the sub-signal processing circuit 61G outputs a drive signal Fg to the color modulating liquid crystal light valve drive circuit 63G at an appropriate timing based on the green video signal Dg and the timing signal Tg thus input. The color modulating liquid crystal light valve drive circuit 63G is configured including a D/A conversion circuit and a driver IC, and applies a drive voltage to the color modulating liquid crystal light valve 17G based on the drive signal Fg thus input, to drive the liquid crystal light valve, and thus varies the transmittance of the light in each of the pixels arranged in a matrix.

Further, the sub-signal processing circuit 61B outputs a drive signal Eb to the luminance modulating liquid crystal light valve drive circuit 62B at an appropriate timing based on the luminance information K (described later) and the timing signal Tb thus input. The luminance modulating liquid crystal light valve drive circuit 62B is configured including a D/A conversion circuit and a driver IC, and applies a drive voltage to the luminance modulating liquid crystal light valve 16B based on the drive signal Eb thus input, to drive the liquid crystal light valve, and thus varies the transmittance of the light in each of the pixels arranged in a matrix. Further, the sub-signal processing circuit 61B outputs a drive signal Fb to the color modulating liquid crystal light valve drive circuit 63B at an appropriate timing based on the blue video signal Db and the timing signal Tb thus input. The color modulating liquid crystal light valve drive circuit 63B is configured including a D/A conversion circuit and a driver IC, and applies a drive voltage to the color modulating liquid crystal light valve 17B based on the drive signal Fb thus input, to drive the liquid crystal light valve, and thus varies the transmittance of the light in each of the pixels arranged in a matrix.

As described above, in the projector 1 according to the present embodiment, there is adopted a configuration in which the three signal processing circuits (the sub-signal processing circuits 61R, 61G, and 61B) for performing the signal processing are disposed for the respective colors independently of each other. By adopting such a configuration, an improvement in processing efficiency due to the reduction of processing load on one signal processing circuit can be expected, and further, suppression of the necessity of an increase in performance, and a reduction in cost due to the suppression can be expected in each of the signal processing circuits in comparison with the configuration in which the signal processing related to all the colors is executed by single signal processing circuit.

On the other hand, in the case of such a configuration, if it is possible to reduce the data amount input from the main signal processing circuit 60 to the sub-signal processing circuits 61R, 61G, and 61B, it becomes possible to achieve an improvement in transmission efficiency in the bus related to an input of each of the sub-signal processing circuits 61R, 61G, and 61B, and an improvement in processing efficiency in each of the sub-signal processing circuits 61R, 61G, and 61B.

Based on the above, the signal processing section 26 of the projector 1 according to the present embodiment performs the following process with the following configuration to thereby realize the reduction in data amount to be input to each of the sub-signal processing circuits 61R, 61G, and 61B.

Figure 3:
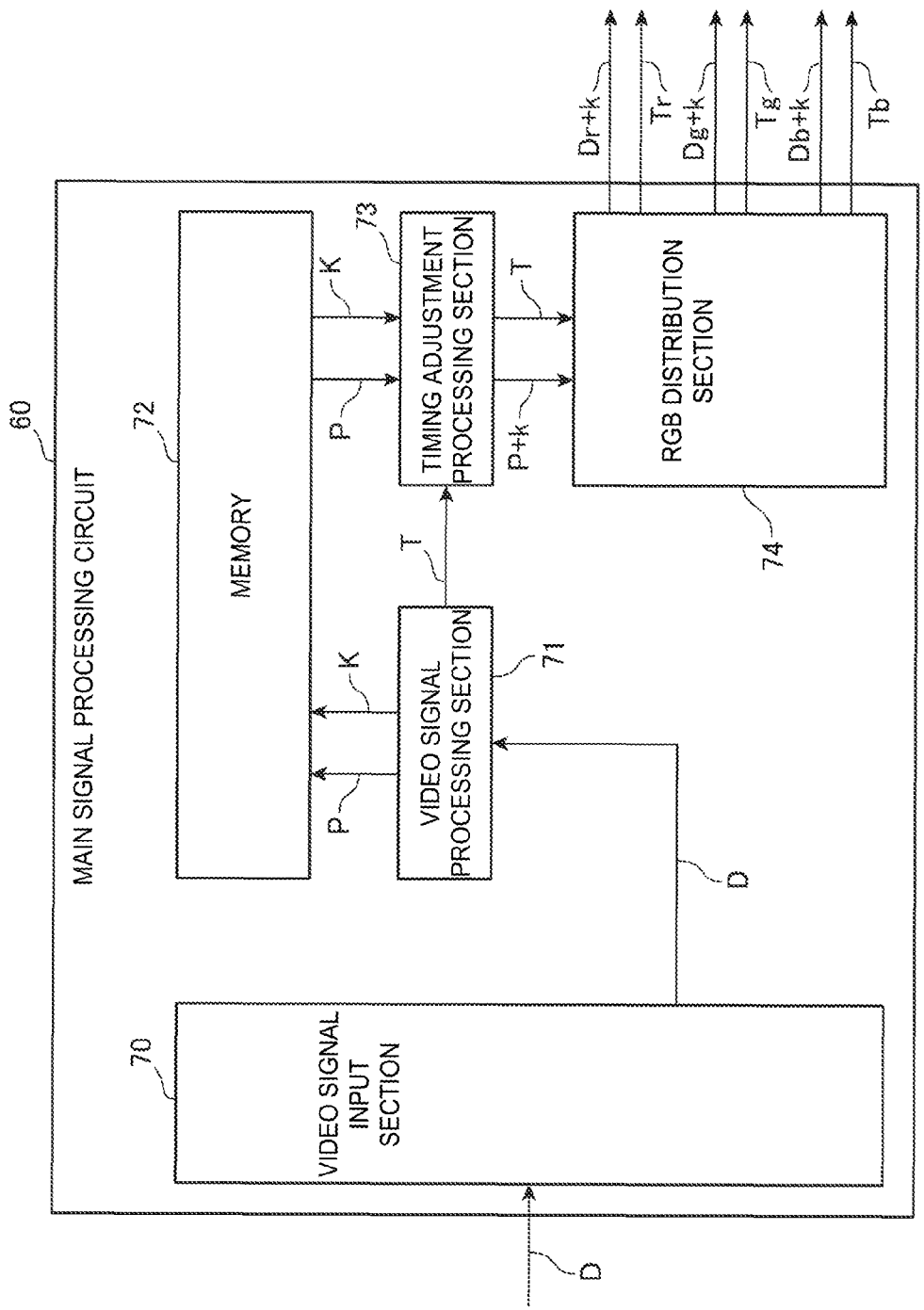
FIG. 3 is a block diagram showing a functional configuration of a main signal processing circuit.

FIG. 3 is a block diagram showing a functional configuration of the main signal processing circuit 60.

As shown in FIG. 3, the main signal processing circuit 60 is equipped with a video signal input section 70, a video signal processing section 71, a memory 72, a timing adjustment processing section 73, and an RGB distribution section 74.

The color video signal D including the vertical sync signal and the horizontal sync signal is input to the video signal input section 70. The video signal input section 70 outputs the color video signal D thus input thereto to the video signal processing section 71.

The video signal processing section 71 clips frame image data P as image data corresponding to one frame from the color video signal D thus input based on the vertical sync signal. The frame image data P is the data constituted by dots, and holds the color components of red (R), green (G), and blue (B) as grayscale values of a predetermined grayscale (e.g., a 256-level grayscale) for every dot.

Further the video signal processing section 71 calculates the luminance with respect to each of the dots constituting the frame image data P to generate the luminance information K configured including information representing the luminance of each of the dots. Here, in the present embodiment, the video signal processing section 71 calculates the luminance of one dot using a weighted average of the grayscale values of red (R), green (G), and blue (B) of the one dot. Although the calculation method of the luminance of the dot is not limited to the above, in order to calculate the luminance of the dot corresponding to a certain pixel in a display device which performs additive color mixing on light beams of the primary colors for each of the pixels constituting an image when displaying the image, the information related to red color (R), green color (G), and blue color (B) of the dot is required.

Subsequently, the video signal processing section 71 makes correspondence between the frame image data P thus generated and the luminance information K, and then temporarily stores the result in the memory 72 provided with a temporary storage area (a buffer).

Further, the video signal processing section 71 generates the timing signal T including the vertical sync signal and the horizontal sync signal based on the vertical sync signal and the horizontal sync signal included in the color video signal D, and then outputs the result to the timing adjustment processing section 73.

The timing adjustment processing section 73 reads out the frame image data P and the luminance information K corresponding to the frame image data P temporarily stored in the memory 72 according to the timing represented by the timing signal T input from the video signal processing section 71.

Subsequently, the timing adjustment processing section 73 outputs the frame image data P and the luminance information K thus read out and the timing signal T thus input thereto to the RGB distribution section 74 in sync with each other.

On this occasion, the timing adjustment processing section 73 outputs a signal based on the luminance information K in a blank period formed after completion of the output of a signal based on the frame image data P in a period corresponding to one cycle defined by the vertical sync signal in the timing signal T.

Figure 4:
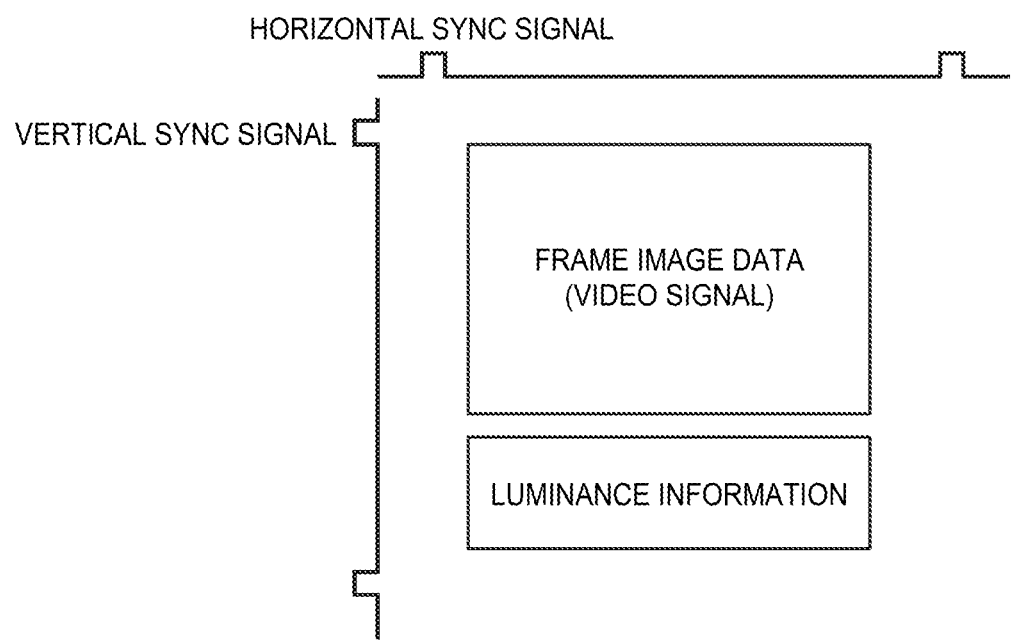
FIG. 4 is a diagram showing a signal output by the main signal processing circuit in relation to vertical and horizontal sync signals.

FIG. 4 is a diagram showing the frame image data P and the luminance information K to be output in relation to the vertical sync signal and the horizontal sync signal in the timing signal T.

As shown in FIG. 4, the frame image data P is output to the RGB distribution section 74 as the signal in sync with the horizontal sync signal in the period corresponding to the one cycle defined by the vertical sync signal. Further, the luminance information K is output to the RGB distribution section 74 as the signal in the blank period formed after the completion of the output of the signal based on the frame image data P in the period corresponding to the one cycle defined by the vertical sync signal.

The RGB distribution section 74 generates the red video signal Dr, which is the video signal of the red component, based on the frame image data P thus input, and at the same time generates the timing signal Tr based on the timing signal T. Then, the RGB distribution section 74 outputs the red video signal Dr, the luminance information K, and the timing signal Tr to the sub-signal processing circuit 61R. On this occasion, the RGB distribution section 74 outputs the signal based on the luminance information K in the blank period formed after the completion of the output of the red video signal Dr in the period corresponding to the one cycle defined by the vertical sync signal in the timing signal Tr similarly to the method explained using FIG. 4.

Similarly, the RGB distribution section 74 generates the green video signal Dg, which is the video signal of the green component, based on the frame image data P thus input, and at the same time generates the timing signal Tg based on the timing signal T. Then, the RGB distribution section 74 outputs the green video signal Dg, the luminance information K, and the timing signal Tg to the sub-signal processing circuit 61G. On this occasion, the RGB distribution section 74 outputs the signal based on the luminance information K in the blank period formed after the completion of the output of the green video signal Dg in the period corresponding to the one cycle defined by the vertical sync signal in the timing signal Tg similarly to the method explained using FIG. 4.

Further, similarly to the above, the RGB distribution section 74 generates the blue video signal Db, which is the video signal of the blue component, based on the frame image data P thus input, and at the same time generates the timing signal Tb based on the timing signal T. Then, the RGB distribution section 74 outputs the blue video signal Db, the luminance information K, and the timing signal Tb to the sub-signal processing circuit 61B. On this occasion, the RGB distribution section 74 outputs the signal based on the luminance information K in the blank period formed after the completion of the output of the blue video signal Db in the period corresponding to the one cycle defined by the vertical sync signal in the timing signal Tb similarly to the method explained using FIG. 4.

It should be noted that the main signal processing circuit 60 performs the process explained above frame by frame based on the color video signal D thus input.

Figure 5:
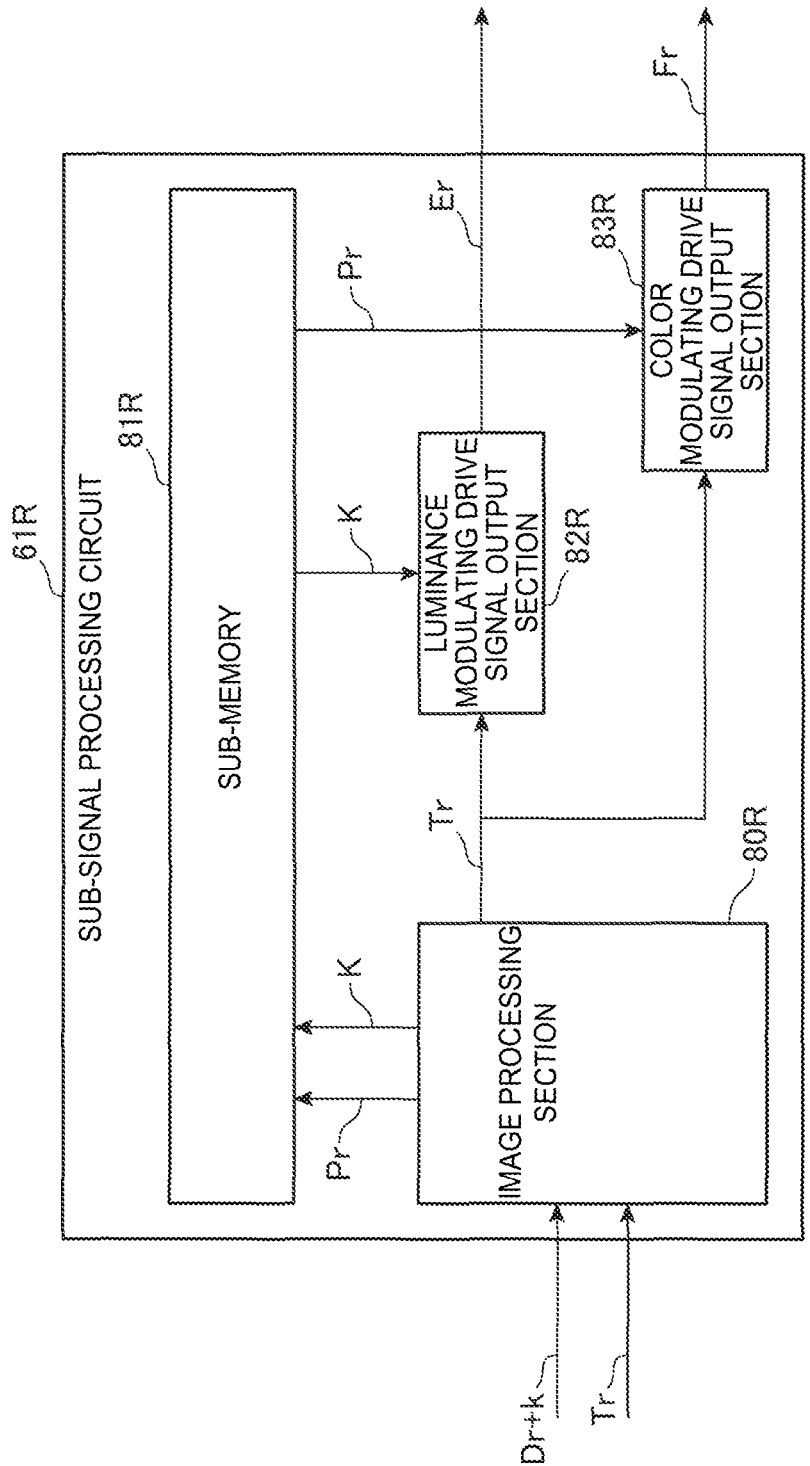
FIG. 5 is a block diagram showing a functional configuration of a sub-signal processing circuit.

FIG. 5 is a block diagram showing a functional configuration of the sub-signal processing circuit 61R.

It should be noted that since the configuration, the function, and the process of the sub-signal processing circuits 61G, 61B are substantially the same as those of the sub-signal processing circuit 61R, the configuration, the function, and the process of the sub-signal processing circuit 61R among these signal processing circuits will hereinafter be explained as a representative.

As shown in FIG. 5, the sub-signal processing circuit 61R is provided with an image processing section 80R, a sub-memory 81R, a luminance modulating drive signal output section 82R, and a color modulating drive signal output section 83R.

The red video signal Dr, the luminance information K, and the timing signal Tr are input to the image processing section 80R.

The image processing section 80R generates red frame image data Pr as the image data corresponding to one frame based on the red video signal Dr thus input.

Then, the image processing section 80R performs a necessary image process such as a process related to an adjustment of the size, a resolution conversion process for absorbing the difference between the resolution of the color video signal D and the resolution of the liquid crystal light valve, a keystone correction process, or an expansion/contraction process based on a zoom instructed by an operation of the remote controller 5 or the like on the red frame image data Pr.

Subsequently, the image processing section 80R makes correspondence between the red frame image data Pr, on which the image process has been performed, and the luminance information K, and then temporarily stores the result in the sub-memory 81R provided with a temporary storage area (a buffer).

Further, the image processing section 80R outputs the timing signal Tr thus input to each of the luminance modulating drive signal output section 82R and the color modulating drive signal output section 83R in a synchronized manner.

The luminance modulating drive signal output section 82R reads out the luminance information K temporarily stored in the sub-memory 81R according to the timing represented by the timing signal Tr input from the image processing section 80R.

Then, the luminance modulating drive signal output section 82R generates the drive signal Er based on the luminance information K thus read out, and then outputs the drive signal Er to the luminance modulating liquid crystal light valve drive circuit 62R at an appropriate timing based on the timing signal Tr thus input.

In a detailed description, the luminance modulating liquid crystal light valve 16R is a member disposed for realizing a high luminance dynamic range. Further, the following function is implemented in the luminance modulating drive signal output section 82R. Specifically, it is the function of determining the optimum transmittance of the light in each of the pixels constituting the luminance modulating liquid crystal light valve 16R based on the luminance of each dot of the frame image data P as the image data corresponding to the one frame from the view point of realizing the high luminance dynamic range, and then generating the drive signal Er to be output for driving the luminance modulating liquid crystal light valve 16R so that each of the pixels has the transmittance thus determined. The luminance modulating drive signal output section 82R generates the drive signal Er based on the luminance information K, and then outputs the drive signal Er to the luminance modulating liquid crystal light valve drive circuit 62R at an appropriate timing based on the timing signal Tr due to the function described above.

As described above, the luminance modulating liquid crystal light valve drive circuit 62R applies the drive voltage to the luminance modulating liquid crystal light valve 16R at an appropriate timing based on the drive signal Er thus input to drive the liquid crystal light valve.

As described above, in the present embodiment, the sub-signal processing circuit 61R performs the process based on the luminance information K. The luminance information K is information generated based on the information of the red color (R), the green color (G), and the blue color (B) in the color video signal D. Further, the main signal processing circuit 60 generates the luminance information K based on the color video signal D, and then outputs the luminance information K to the sub-signal processing circuit 61R. The sub-signal processing circuit 61R to which the luminance information K has been input generates and then outputs the drive signal Er using the luminance information K.

Due to such a configuration as described above, it is not required for the sub-signal processing circuit 61R to have a configuration of input the video signals of other colors than the red color in order to generate the luminance information K. Therefore, the amount of data input from the main signal processing circuit 60 to the sub-signal processing circuit 61R can be reduced to thereby achieve the improvement in communication efficiency in the bus for connecting these circuits, and at the same time, it is not necessary to dispose signal lines for inputting/outputting information necessary to generate the luminance information K such as the color video signal D or the video signals of other colors, and therefore, it is not necessary to dispose input/output pins corresponding to the sub-signal processing circuit 61R.

In particular in the present embodiment, since the luminance information K is output from the main signal processing circuit 60 to the sub-signal processing circuit 61R using the blank period described above, the data output can effectively be performed.

Further, it is not necessary to implement the function of generating the luminance information K to the sub-signal processing circuit 61R, and therefore, it becomes possible to achieve an improvement in processing efficiency in the sub-signal processing circuit 61R.

The advantage described above also applies to the sub-signal processing circuits 61G, 61B.

Meanwhile, the color modulating drive signal output section 83R reads out the red frame image data Pr temporarily stored in the sub-memory 81R according to the timing represented by the timing signal Tr input from the image processing section 80R.

Then, the color modulating drive signal output section 83R generates the drive signal Fr based on the red frame image data Pr thus read out, and then outputs the drive signal Fr to the color modulating liquid crystal light valve drive circuit 63R at an appropriate timing based on the timing signal Tr thus input.

As described above, the color modulating liquid crystal light valve drive circuit 63R applies the drive voltage to the color modulating liquid crystal light valve 17R at an appropriate timing based on the drive signal Fr thus input to drive the liquid crystal light valve. As a result, the light transmitted through the color modulating liquid crystal light valve 17R is modulated in accordance with the image to be projected.

As explained hereinabove, the projector 1 according to the present embodiment is provided with the main signal processing circuit 60 to which the color video signal D is input, and the plurality of sub-signal processing circuits 61R, 61G, and 61B to which the video signals for the respective colors having been output from the main signal processing circuit 60 are input. Further, the main signal processing circuit 60 generates the information, which is used when the sub-signal processing circuits 61R, 61G, and 61B perform a predetermined process, based on the information of the plurality of colors in the color video signal D thus input, and then outputs the information to the respective sub-signal processing circuits 61R, 61G, and 61B together with the video signals for the respective colors.

According to this configuration, it is not necessary to output the video signals of the plurality of colors from the main signal processing circuit 60 to the sub-signal processing circuits 61R, 61G, and 61B, and thus, the reduction in the amount of data to be input to the sub-signal processing circuits 61R, 61G, and 61B can be achieved.

Further, in the present embodiment, each of the sub-signal processing circuits 61R, 61G, and 61B performs the process based on the information related to the luminance, and the main signal processing circuit 60 generates the luminance information K, which is the information related to the luminance, based on the information of the red color (R), the green color (G), and the blue color (B) in the color video signal D thus input, and then outputs the luminance information K to the respective sub-signal processing circuits 61R, 61G, and 61B together with the video signals for the respective colors.

According to this configuration, it is not necessary to adopt the configuration in which the video signals of the plurality of colors are input to the sub-signal processing circuits 61R, 61G, and 61B, and then the sub-signal processing circuits 61R, 61G, and 61B generate the luminance information K, and thus, the reduction in the amount of data to be input to each of the sub-signal processing circuits can be achieved. Further, the processing efficiency of the sub-signal processing circuits 61R, 61G, and 61B can be improved.

Further, the projector 1 according to the present embodiment is provided with the luminance modulating liquid crystal light valves 16R, 16G, and 16B (the luminance modulation sections) and the color modulating liquid crystal light valves 17R, 17G, and 17B (the color modulation sections). Further, the sub-signal processing circuits 61R, 61G, and 61B generate and then output the drive signals for driving the corresponding luminance modulating liquid crystal light valves 16R, 16G, and 16B based on the luminance information K thus input, and at the same time, generate and then output the drive signals for driving the corresponding color modulating liquid crystal light valves 17R, 17G, and 17B based on the video signals for the respective colors thus input.

According to this configuration, it becomes possible to appropriately drive the luminance modulating liquid crystal light valves 16R, 16G, and 16B and the color modulating liquid crystal light valves 17R, 17G, and 17B while achieving the reduction in the amount of data to be input to the sub-signal processing circuits 61R, 61G, and 61B.

Further, the main signal processing circuit 60 outputs the video signals for the respective colors to the sub-signal processing circuits 61R, 61G, and 61B in sync with the vertical sync signal, and at the same time, outputs the luminance information K in the blank period formed after the completion of the output of the video signals in the period corresponding to the one cycle defined by the vertical sync signal.

According to this configuration, the reduction in the amount of data input to the sub-signal processing circuits 61R, 61G, and 61B can more efficiently be realized.

It should be noted that the embodiment described above is only for showing an aspect of the invention, and can arbitrarily be modified or applied within the scope of the invention.

For example, in the embodiment described above, the luminance information K corresponds to the "information used when the sub-signal processing circuits perform a predetermined process." However, the "information used when the sub-signal processing circuits perform a predetermined process" is not limited to the luminance information K, but can be information related to, for example, chromaticness or brightness if the sub-signal processing circuits 61R, 61G, and 61B perform a process based on the chromaticness or the brightness. In other words, the "information used when the sub-signal processing circuits perform a predetermined process" is information generated based on the information of the plurality of colors, and is a concept broadly including information to be provided to the process in the sub-signal processing circuits 61R, 61G, and 61B.

Further, although in the above description of the embodiment, the invention is explained using the case of applying the invention to the projector provided with the plurality of signal processing circuits having the function of the image processing as an example, it is also possible to apply the invention to a projector, for example, having a plurality of projection optical systems, and displaying an image while overlapping the whole or a part of the images projected by the respective projection optical systems each other, and having a plurality of integrated circuits (IC) for controlling the respective projection optical systems. In other words, the invention can widely be applied to display devices provided with the signal processing circuits for the respective colors.

Further, each of the functional sections of the projector 1 shown in FIGS. 1 through 3, and 5 is for showing the functional configuration realized by the cooperation of hardware and software, and the specific mounting configuration is not particularly limited. Therefore, it is not necessarily required to install the hardware corresponding individually to each of the functional sections, but it is obviously possible to adopt a configuration of realizing the functions of the plurality of functional sections by one processor executing a program. Further, a part of the function realized by software in the embodiment described above can also be realized by hardware, or a part of the function realized by hardware can also be realized by software. Besides the above, the specific detailed configuration of each of other sections of the projector 1 can arbitrarily be modified within the scope or the spirit of the invention.

Further, it is also possible for the projector 1 to download the control program, which is stored in the storage section 23 in the embodiment described above, from another device connected via the communication network, and then execute the control program, or it is also possible to adopt a configuration of recording the control programs on a portable recording medium, retrieving each of the programs from the recording medium, and then executing the program.

Further, although in the embodiment described above, the transmissive liquid crystal light valve is used as the "color modulation section" and the "luminance modulation section," the invention is not limited to this configuration. It is also possible to adopt a reflective liquid crystal light valve or a light valve other than the liquid crystal type (e.g., a digital micromirror device (DMD) having a plurality of microscopic mirrors) as the "color modulation section" and the "luminance modulation section."

Further, the "luminance modulation section" and the "color modulation section" corresponding to each other can be the same or different in the number of pixels. Regarding the correspondence relationship between the pixels, one-to-one relationship can be adopted, or one pixel of one section can also correspond to a plurality of pixels of the other section.

Further, although the functional section corresponding to the "light source and the luminance modulating light valve" controls the light intensity of the light entering the color modulation section, it is also possible to control the light intensity of the light entering the color modulation section using other methods. For example, it is also possible to control the intensity of the light entering the color modulation section using an LED array having a plurality of LEDs arranged in a matrix. In this case, it results that the LED array is used instead of the "light source" and the "luminance modulating light valves."

What is claimed is:

1. A display device comprising:
a main signal processing circuit to which color video data is input;
a plurality of sub-signal processing circuits to which video data for respective colors output by the main signal processing circuit are input; and
a plurality of light modulating drive circuits respectively disposed for each of the plurality of sub-signal processing circuits,
wherein
the main signal processing circuit generates information, which is used when each of the sub-signal processing circuits performs a predetermined process, based on information of a plurality of colors in the color video data input, and then outputs data representing the generated information to each of the sub-signal processing circuits together with the video data for the respective colors,
each of the sub-signal processing circuits performs a process based on information related to luminance,
the main signal processing circuit generates the information related to the luminance based on the information of the plurality of colors in the color video data input, and then outputs data representing the generated information related to the luminance to each of the sub-signal processing circuits together with the video data for the respective colors,
each of the plurality of sub-signal processing circuits outputs a drive signal to a respective corresponding light modulating drive circuit of the plurality of light modulating drive circuits,
each of the plurality of light modulating drive circuits applies a drive voltage to a corresponding light modulation section of a plurality of light modulation sections based on the drive signal,
the main signal processing circuit outputs the video data for the respective colors to each of the sub-signal processing circuits in sync with a vertical sync signal, and
the main signal processing circuit outputs the data representing the information, which is used when each of the sub-signal processing circuits performs the predetermined process, to each of the sub-signal processing circuits in a blank period formed after completion of output of the video data in a period corresponding to one cycle defined by the vertical sync signal.

2. The display device according to claim 1, wherein the plurality of light modulation sections include a color modulation section and a luminance modulation section corresponding to each of the colors,
wherein each of the sub-signal processing circuits generates the drive signal for driving the color modulation section corresponding to a color based on the video data input and corresponding to the color, and then outputs the drive signal to the corresponding color modulation section via the corresponding light modulating drive circuit, and
each of the sub-signal processing circuits generates the drive signal for driving the corresponding luminance modulation section based on the data representing the information related to the luminance input, and then outputs the drive signal to the corresponding luminance modulation section via the corresponding light modulating drive circuit.

3. A method of controlling a display device including a main signal processing circuit to which color video data is input, a plurality of sub-signal processing circuits to which video data for respective colors output by the main signal processing circuit are input, and a plurality of light modulating drive circuits respectively disposed for each of the plurality of sub-signal processing circuits, the method comprising:

allowing the main signal processing circuit to
generate information used when each of the sub-signal processing circuits performs a predetermined process based on information of a plurality of colors in the color video data input; and
output data representing the generated information to each of the sub-signal processing circuits together with the video data for the respective colors, allowing each of the sub-signal processing circuits to
perform a process based on information related to luminance, and
output a drive signal to a respective corresponding light modulating drive circuit of the plurality of light modulating drive circuits, and allowing each of the plurality of light modulating drive circuits to apply a drive voltage to a corresponding light modulation section of a plurality of light modulation sections based on the drive signal, wherein
the main signal processing circuit generates the information related to the luminance based on the information of the plurality of colors in the color video data input, and then outputs data representing the generated information related to the luminance to each of the sub-signal processing circuits together with the video data for the respective colors, the main signal processing circuit outputs the video data for the respective colors to each of the sub-signal processing circuits in sync with a vertical sync signal, and the main signal processing circuit outputs the data representing the information, which is used when each of the sub-signal processing circuits performs the predetermined process, to each of the sub-signal processing circuits in a blank period formed after completion of output of the video data in a period corresponding to one cycle defined by the vertical sync signal.

4. A display device comprising:
a main signal processing circuit to which color video data is input;
a plurality of sub-signal processing circuits to which video data for respective colors output by the main signal processing circuit are input; and
a plurality of light modulating drive circuits respectively disposed for each of the plurality of sub-signal processing circuits, wherein
the main signal processing circuit generates information, which is used when each of the sub-signal processing circuits performs a predetermined process, based on information of a plurality of colors in the color video data input, and then outputs data representing the generated information to each of the sub-signal processing circuits together with the video data for the respective colors, the main signal processing circuit outputs the video data for the respective colors to each of the sub-signal processing circuits in sync with a vertical sync signal, the main signal processing circuit outputs the data representing the information, which is used when each of the sub-signal processing circuits performs the predetermined process, to each of the sub-signal processing circuits in a blank period formed after completion of output of the video data in a period corresponding to one cycle defined by the vertical sync signal, each of the plurality of sub-signal processing circuits outputs a drive signal to a respective corresponding light modulating drive circuit of the plurality of light modulating drive circuits, and each of the plurality of light modulating drive circuits applies a drive voltage to a corresponding light modulation section of a plurality of light modulation sections based on the drive signal.

* * * * *